3,559,287
APPARATUS FOR DRAINING CURD IN MAKING CHEESE
Armand François Bronkhorst, Doorn, Netherlands, assignor to Holvrieka International N.V., Utrecht, Netherlands, a corporation of the Netherlands
Filed Nov. 21, 1968, Ser. No. 777,839
Claims priority, application Netherlands, Nov. 27, 1967, 6716103
Int. Cl. A01j 25/00, 25/12
U.S. Cl. 31—46                                3 Claims

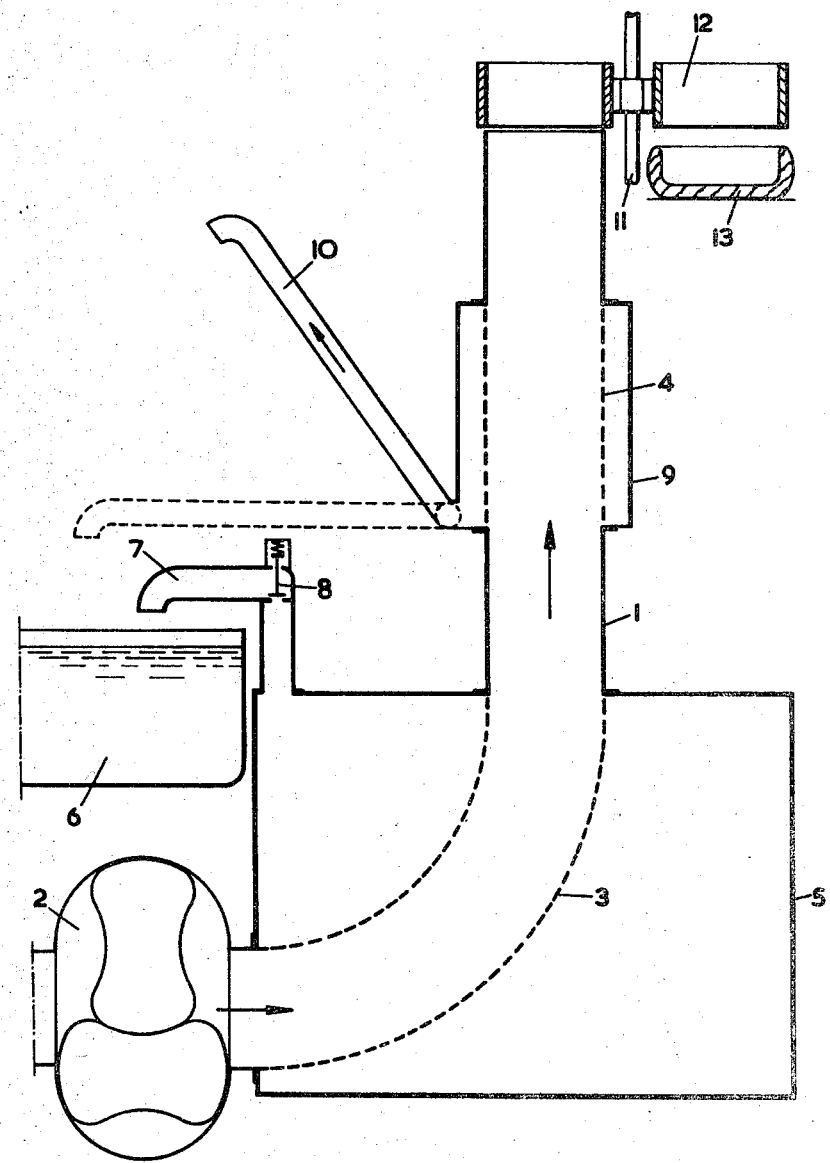

ABSTRACT OF THE DISCLOSURE

An apparatus for draining curd in making cheese comprising a riser tube consisting of one or more successive sections with perforated walls to subject a whey-curd composition to a ready pre-drainage and an accurately controllable after-drainage so as to make for a just control of the ultimate result.

---

This invention relates to an apparatus for draining curd in making cheese, by extracting whey therefrom.

Although vast developments have taken place in this sphere, there is still a need for a reliably operating draining apparatus which, upon continuous operation, is capable of delivering curd with an adjustable, constant moisture content.

It is an object of the present invention to fill this gap.

To this effect, the draining apparatus according to the invention is provided with a riser tube, to the lower end of which is connected a pump for supplying a whey-curd composition and to the upper end of which is connected a member for discharging drained curd, the riser comprising at least one section with a perforated wall, wherein the or each section is passed through a chamber with an outlet line for the whey. The or each outlet line may be provided with a pressure regulator.

In illustration of the invention one embodiment will now be described, by way of example, with reference to the accompanying drawing.

In this drawing, the draining apparatus includes a riser 1 to the lower end of which is connected a centrifugal pump 2 for feeding into said riser a conventionally pre-drained whey-curd composition coming from a cheese-tub (not shown), said composition containing per 100 parts of solid material about 250 parts of enclosed whey and about 250 parts of loose whey.

The riser 1 comprises two successive sections 3 and 4 with perforated walls.

The riser section 3 extends through a chamber 5 provided with an outlet pipe 7 discharging into a whey-discharge tub 6, said pipe 7 having provided therein an adjustable outlet valve 8 regulating the pressure within the chamber 5.

The riser section 4 extends through a chamber 9 having an outlet line 10 which is capable of swinging in a vertical plane and is adjustable to keep the pressure within chamber 9 at the desired value.

At the top of the riser 1 a discharge member 12 is mounted for rotation about a vertical shaft 11. The member 12 serves for the periodical transmittance of drained curd from the discharge end of the riser 1 to a cheese mould 13 which is moved intermittently towards and away from the position of curd discharge.

When the draining apparatus is in operation, approximately 90% of the whey to be extracted from the whey-curd composition is passed from the riser 1 to the chamber 5 via the perforated wall of the riser section 3. This amount is controlled by the pressure adjusted by means of the valve 8. Subsequently the whey is discharged into the tub 6. As the remaining whey-curd composition moves up past the perforated riser section 4, another quantity of approximately 10% of whey is extracted from that remaining composition by properly setting the outlet line 10, and is discharged via the chamber 9 into the tub 6. As a result, the curd delivered at the top of the riser 1 has the desired moisture content, which is normally about 43% of the total weight and is caused, in the main, by enclosed whey. Curd of this kind can be suitably brought direct into cheese moulds.

The ready and continuous drainage of the whey-curd composition fed to and moved up in the riser is mainly due to the circumstance that the fine curd particles, which are inevitably contained in the whey-curd composition and constantly tend to clog the draining passages in the composition by settling, are kept afloat in the apparatus as the whey-curd column moves up in the riser. Hence these curd particles cannot hamper the rapid discharge of whey.

Thanks to the construction of the successive, separate draining sections of the riser, it is possible to achieve a quickly running pre-drainage and an accurately controllable after-drainage, so that the ultimate result can be well dictated.

It will be understood that the structural details of the apparatus according to this invention, especially the construction of the pressure regulators, leaves a high degree of freedom.

I claim:
1. Apparatus for draining curd in a cheese making process, comprising
   a riser tube means having (a) a lower end for receiving a whey-curd composition, (b) at least one section which is perforated so that whey can be removed from said whey-curd composition, and (c) an upper end from which drained cured can be discharged,
   a pump means in communication with said lower end of the riser tube means for supplying whey-curd composition into the riser tube means,
   a chamber means having wall means enclosing said section of the riser tube which is perforated so that whey which is drained from said riser tube can be received into said chamber,
   an outlet line means from said chamber means for discharging whey from the chamber means,
   a pressure regulator means included in said outlet line means for regulating the pressure within said chamber means so that the amount of whey removed from said whey-curd composition can be controlled, and
   a discharge member associated with said upper end of the riser tube means for removing drained curd which has been discharged from said upper end of the riser tube means.
2. The apparatus of claim 1 wherein successive perforated sections are provided in said riser tube means, with each perforated section being enclosed by a chamber means having a whey outlet line means.
3. The apparatus of claim 2 wherein each of said whey outlet line means is provided with a pressure regulator means.

References Cited
UNITED STATES PATENTS

| | | | |
|---|---|---|---|
| 3,368,278 | 2/1968 | Opie | 31—46 |
| 3,438,131 | 4/1969 | Ubbels et al. | 31—46 |
| 3,468,026 | 9/1969 | Robertson et al. | 31—89 |

HUGH R. CHAMBLEE, Primary Examiner